US010229386B2

(12) United States Patent
Thomas

(10) Patent No.: US 10,229,386 B2
(45) Date of Patent: Mar. 12, 2019

(54) PRODUCT TAGS, SYSTEMS, AND METHODS FOR CROWDSOURCING AND ELECTRONIC ARTICLE SURVEILLANCE IN RETAIL INVENTORY MANAGEMENT

(71) Applicant: eBay Inc., San Jose, CA (US)

(72) Inventor: Evan Patrick Thomas, Portland, OR (US)

(73) Assignee: eBay Inc., San Jose, CA (US)

( * ) Notice: Subject to any disclaimer, the term of this patent is extended or adjusted under 35 U.S.C. 154(b) by 371 days.

(21) Appl. No.: 15/059,401

(22) Filed: Mar. 3, 2016

(65) Prior Publication Data
US 2017/0255898 A1 Sep. 7, 2017

(51) Int. Cl.
G06Q 10/08 (2012.01)
G08B 13/24 (2006.01)

(52) U.S. Cl.
CPC ......... G06Q 10/087 (2013.01); G08B 13/246 (2013.01)

(58) Field of Classification Search
CPC .. G06Q 10/087; G06Q 30/0207; G06Q 30/02; G08B 13/246
USPC .......... 705/28, 26.1, 16, 17, 21, 27.1, 14.26, 705/14.13, 26.8; 235/375, 383
See application file for complete search history.

(56) References Cited

U.S. PATENT DOCUMENTS

| 2004/0162765 | A1* | 8/2004 | Reber | G06Q 10/087 705/26.9 |
| 2008/0015953 | A1* | 1/2008 | Harper | G06F 17/30893 705/7.28 |
| 2011/0246284 | A1* | 10/2011 | Chaikin | G06Q 20/105 705/14.38 |
| 2013/0282533 | A1* | 10/2013 | Foran-Owens | G06Q 30/0641 705/27.1 |
| 2013/0290096 | A1* | 10/2013 | Lizotte, III | G06Q 30/0246 705/14.45 |
| 2013/0339115 | A1* | 12/2013 | Soldate | G06Q 30/06 705/14.23 |
| 2015/0206189 | A1* | 7/2015 | Norwood | G06Q 30/0261 705/14.58 |
| 2015/0324881 | A1* | 11/2015 | Ouimet | G06Q 30/02 705/14.49 |

* cited by examiner

Primary Examiner — Vanel Frenel
(74) Attorney, Agent, or Firm — Schwegman Lundberg & Woessner, P.A.

(57) ABSTRACT

An inventory management system includes at least one hardware processor and an inventory management engine executing on the at least one hardware processor. The inventory management engine is configured to receive, from a mobile computing device of a consumer, product information associated with an article offered for sale in a retail establishment of a merchant, a product tag is attached to the article and includes a tag ID, the tag ID being a unique identifier assigned to the product tag. The inventory management engine also receives the tag ID from the mobile computing device, generates an online listing for the article in an online marketplace, the online listing including the product information, associates the tag ID with the online listing, determines that the merchant is associated with the article, and places the online listing for sale in the online marketplace on behalf of the merchant.

20 Claims, 8 Drawing Sheets

US 10,229,386 B2

PRODUCT TAGS, SYSTEMS, AND METHODS FOR CROWDSOURCING AND ELECTRONIC ARTICLE SURVEILLANCE IN RETAIL INVENTORY MANAGEMENT

TECHNICAL FIELD

Embodiments of the present disclosure relate generally to retail inventory management and, more particularly, but not by way of limitation, to product tags, systems, and methods for crowdsourcing and electronic article surveillance in inventory management.

BACKGROUND

Traditional product sensors in electronic article surveillance (EAS) focus on security of retail merchandise within a retailer's "brick-and-mortar" stores. Various technologies exist that enable retailers or manufacturers to "tag" retail merchandise to help reduce occurrences of shoplifting, or to alert when incidents of shoplifting occur. For example, acousto-magnetic tags may be affixed to merchandise and may be activated and deactivated by the retailer. An activated tag may trigger a proximity alarm when a shoplifter carries the merchandise past the alarm (e.g., normally positioned at a storefront entrance).

The ubiquity of online e-commerce technology (e.g., online shopping) has enabled retailers to reach consumers much more broadly than possible with brick-and-mortar storefronts alone. However, most retail inventory still exists solely in "offline" stores. For many smaller retailers, listing their products in an online environment requires administrative overhead or technical expertise that may represent a daunting process, and may be economically unattractive relative to the work required (e.g., based on the amount of work to list, or relative to the difference in additional sales that may be generated). Further, once listed online, inventory management between in-store sales and the status of online listings becomes an additional administrative burden on the retailer.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used. Like numbers in the Figures indicate like components.

DETAILED DESCRIPTION

Figure 1:
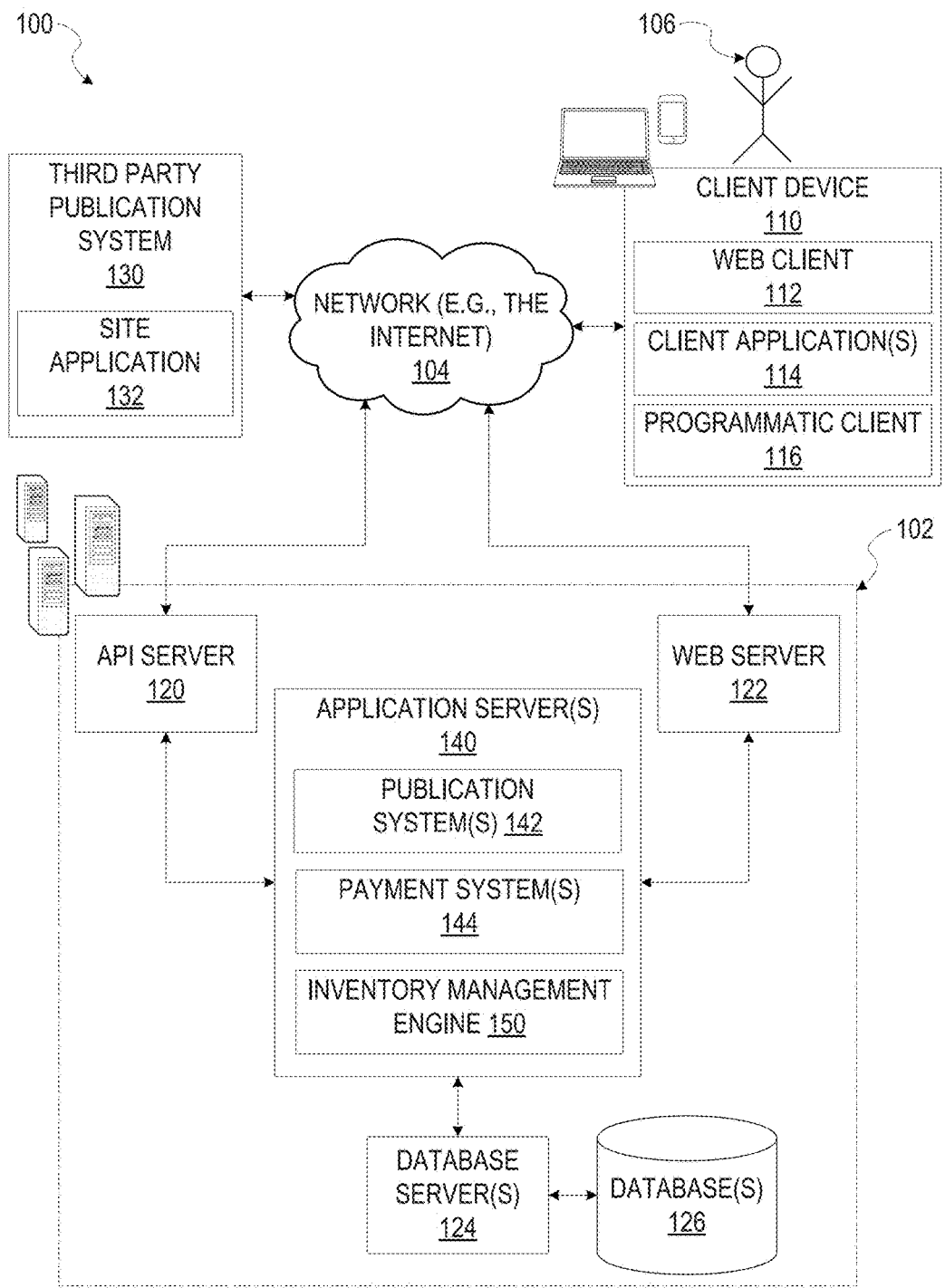
FIG. 1 is a network diagram depicting an example online e-commerce system.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Various product tags and an inventory management engine are described herein that enable retailers to bring their product inventory "online" (e.g., offered for sale in an online e-commerce marketplace), and to track changes in that inventory as products are listed and sold. In one embodiment, a product tag (or "attached tag") is attached to an article of merchandise offered for sale at a retail store, or to product packaging of the article. The retailer may affix tags to merchandise prior to shelving the article for sale (e.g., fastened through a garment, or on a label adhered to a toy box), or the merchant may affix tags to merchandise during the manufacture or packaging process. The attached tags each include a tag identifier (or "tag ID") that may be used to distinguish one article of merchandise from another (e.g., a unique identifier). For example, the attached tag may be visual (e.g., with the tag ID embodied in a quick response (QR) code and read through image recognition), or the attached tag may use integrated circuits (e.g., with the tag ID embodied in an integrated circuit chip and read from a short distance using radio-frequency identification (RFID) technology). The attached tag is used by the inventory management engine to enable aspects of inventory management described herein.

The retailer shelves the tagged article at their storefront, thereby offering the product for sale to traditional (e.g., in-store) consumers. In one example embodiment, the retailer has not yet offered the tagged article for sale in an online environment and, though the article has an attached tag somehow affixed to itself, the inventory management engine has no association between the tag ID and the tagged article at this stage, referred to herein as "tag unidentified."

A shopper enters the store and inspects the tagged article. The shopper carries with them a location-aware mobile device (e.g., a smartphone with GPS) having a client app in communication with the inventory management engine. Using the client app, the shopper captures the tag ID of the tagged article (e.g., image capture of the QR code using an integrated camera on the smartphone, or proximity scan the RFID tag using an RFID reader of the smartphone) and enters product information associated with the article (e.g., product title, retailer's offer price, size, photo). Further, the client device captures location data at the shopper's current location ("shopper location data", e.g., a latitude and longitude captured using the GPS of the smartphone). This data, collectively referred to as "shopper-provided article data," is transmitted to the inventory management engine (e.g., via wireless communication from the client device).

From the shopper location data, the inventory management engine determines the subject retailer. More specifically, the subject retailer's store location is geo-fenced prior to the shopper's visit. As such, the inventory management engine determines the retailer by comparing the shopper location data (e.g., GPS coordinates of the smartphone) to the geo-fenced perimeter of the retailer's store (e.g., predefined boundaries for the store, defined based on latitude and longitude) to determine the subject retailer (e.g., a clothing store, as distinguished from a neighboring toy store).

The inventory management engine generates an online listing, on behalf of the subject retailer, for the article entered by the shopper. The online listing may include, for example, the product title, the retailer's offer price, the photo, or other shopper-provided article data. Further, if the article includes an attached tag, the inventory management engine may associate the tag ID with the listing. The inventory management engine may alert the retailer of the listing (e.g., via an email alert, or via a retailer graphical user interface (GUI)), and may enable the retailer to approve or edit the listing prior to publication on an online e-commerce system. The listing is then published for sale via the online e-commerce system. As such, the shopper instigates the article listing, and enters at least some of the listing data, thereby reducing some overhead and work required by the retailer to get the article offered in an online retail environment.

In some embodiments, when the article is sold in an in-store sale, the attached tag is entered (e.g., scanned at a point-of-sale (POS) device). The inventory management engine identifies the tag ID, determines if there is an online listing associated with that tag ID, and subsequently de-lists the article (e.g., based on the in-store sale, and that article no longer being available).

In some embodiments, a product sensor is provided. The product sensor is installed in-store, proximate an article or set of articles. The product sensor is configured to detect the presence or absence of an article, such as a garment. In some embodiments, the product sensor may detect the presence or absence of the product via a weight or pressure sensor (e.g., a hanger or a platform with a load sensor or strain gauge). In some embodiments, the product sensor may detect the presence or absence of the product using nearfield communication (e.g., between an article attached to the clothing, such as the attached tag, and a fixed sensor on a product stand).

Each of the product sensors may be associated with a particular tag ID. As such, during operation, when a particular product is detected as absent, the inventory management engine determines whether there is an existing listing for the associated product (e.g., via the tag ID). The inventory management engine may de-list the associated product automatically (e.g., after a pre-determined amount of time absent, such as 30 minutes), or may change the status of the product listing to reflect uncertainty about the product (e.g., automatically set the product to "off the shelf," or "unknown," or "suspended," as someone may have purchased the product, or the product may have been removed and lost). As such, the inventory management engine may automatically alter product listings based on detecting the product as absent from its normal location.

FIG. 1 is a network diagram depicting an example online e-commerce system 100. In the example embodiment, the online e-commerce system 100 includes a networked system 102 that enables crowdsourcing and electronic article surveillance in retail inventory management. The networked system 102 includes an inventory management engine 150 for providing electronic article surveillance and generating listings for retail inventory on the online e-commerce system 100, and other associated operations, as described herein.

The networked system 102 provides network-based, server-side functionality, via a network 104 (e.g., the Internet or a Wide Area Network (WAN)), to the client devices 110 that may be used, for example, by sellers or buyers (not separately shown) of products and services offered for sale through a publication system 142 (e.g., through an online marketplace system provided by the publication systems 142 or payment systems 144). FIG. 1 further illustrates, for example, one or more of a web client 112 (e.g., a web browser), client application(s) 114, and a programmatic client 116 executing on the client device 110.

Each of the client devices 110 comprises a computing device that includes at least a display and communication capabilities with the network 104 to access the networked system 102. The client device 110 includes devices such as, but not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client devices 110 connects with the network 104 via a wired or wireless connection. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 includes one or more client applications (also referred to as "apps") 114 such as, but not limited to, a web browser, a messaging application, an electronic mail (email) application, an e-commerce site application (also referred to as a marketplace application), and the like. In some embodiments, if the e-commerce site application is included in a given one of the client devices 110, then this application is configured to locally provide the user interface and at least some of the functionalities of an e-commerce site, with the application configured to communicate with the networked system 102, on an as-needed basis, for data or processing capabilities not locally available (e.g., such as access to a database of items available for sale, to authenticate a user, or to verify a method of payment). Conversely, if the e-commerce site application is not included in a given one of the client devices 110, the given one of the client devices 110 may use its web client 112 to access the e-commerce site (or a variant thereof) hosted on the networked system 102. Although only one client device 110 is shown in FIG. 1, two or more client devices 110 may be included in the online e-commerce system 100.

An Application Program Interface (API) server 120 and a web server 122 are coupled to, and provide programmatic and web interfaces respectively to, one or more application servers 140. In the example embodiment, the application servers 140 host the content analysis engine 150 that facilitates providing analysis and recommendation services, as described herein. The application servers 140 are, in turn, shown to be coupled to one or more database servers 124 that facilitate access to one or more databases 126.

In some embodiments, the application servers 140 host one or more publication systems 142 and payment systems 144. The publication system 142 may provide a number of e-commerce functions and services to users that access the networked system 102 or external sites (e.g., a third party publication system 130 executing a site application 132). E-commerce functions and services may include a number of publisher functions and services (e.g., search, listing, content viewing, payment, etc.). For example, the publication system 142 may provide a number of services and functions to users for listing or submitting offers for goods or services for sale, searching for goods and services, facilitating transactions, and reviewing and providing feedback about transactions and associated users. Additionally, the publication system 142 may track and store data and metadata relating to listings, transactions, and user interactions. In some embodiments, the publication system 142 may publish or otherwise provide access to content items stored in the application servers 140 or the databases 126 accessible to the application servers 140 or the database servers 124. The payment system 144 may likewise provide a number of payment services and functions to users. The payment system 144 may allow users to accumulate value (e.g., in a commercial currency, such as the U.S. dollar, or a proprietary currency, such as "points") in accounts, and then later to redeem the accumulated value for products or items (e.g., goods or services) that are made available via the publication system 142. While the publication system 142 and the payment system 144 are shown in FIG. 1 to both form part of the networked system 102, it will be appreciated that, in alternative embodiments, the payment system 144 may form part of a payment service that is separate and distinct from the networked system 102. In other embodiments, the payment system 144 may be omitted from the online e-commerce system 100. In some embodiments, at least a portion of the publication system 142 may be provided on the client devices 110.

Further, while the online e-commerce system 100 shown in FIG. 1 employs a client-server architecture, some example embodiments of the present disclosure are not limited to such an architecture, and may equally well find application in, for example, a distributed or peer-to-peer architecture system. The various publication and payment systems 142 and 144 may also be implemented as stand-alone software programs, which do not necessarily have networking capabilities.

The client devices 110 access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the TurboLister application developed by eBay Inc., of San Jose, Calif.) to enable sellers to author and manage listings on the networked system 102 in an offline manner, and to perform batch-mode communications between the programmatic client 116 and the networked system 102.

In the example embodiment, the user 106 may be a shopper physically located at a retail store of a merchant (not separately depicted in FIG. 1), and carries with them a mobile computing device (e.g., a smartphone, client device 110). Using the client device 110, the user 106 enters product information for an article of merchandise offered for sale by the merchant and transmits this data to the inventory management engine 150. This data may, for example, a product name, a product photo, an offer price, and may also include a tag ID associated with the article. The inventory management engine 150 receives this product data, generates a listing on the e-commerce system 100 for the article, and may associate that listing with the given tag ID. As such, the inventory management engine 150 enables "crowdsourcing" of listing generation for physical inventory in merchants' physical retail environments.

Figure 2:
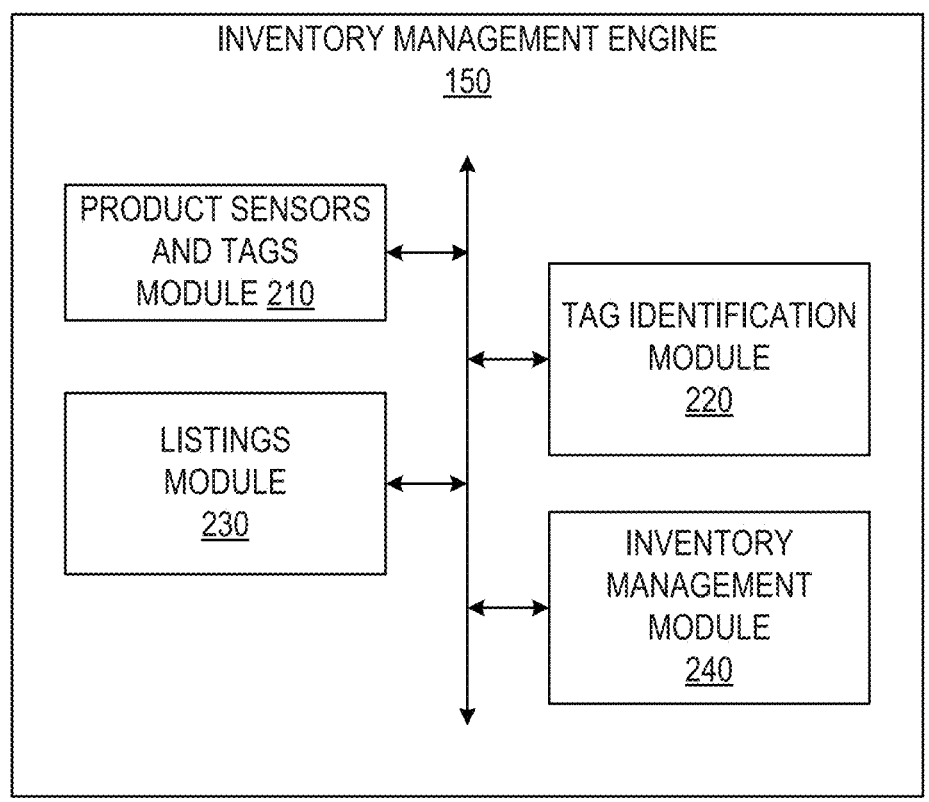
FIG. 2 is a block diagram showing components provided within the inventory management engine according to some embodiments.

FIG. 2 is a block diagram showing components provided within the inventory management engine 150 according to some embodiments. The inventory management engine 150 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124 (both shown in FIG. 1). In some embodiments, one or more of the modules 210, 220, 230, 240 shown in FIG. 2 may be executed by a server or cloud-based device (e.g., application server 140, third party publication system 130), or by a client device (e.g., client device 110).

The inventory management engine 150 provides a number of inventory management features related to listings, whereby the inventory management engine 150 enables merchants to leverage crowdsourcing (e.g., via consumers shopping in their physical retail environments) to generate listings in an online e-commerce system 100, and to manage aspects of those listings. To this end, the example inventory management engine 150 includes a product sensors and tags module 210, a tag identification module 220, a listings module 230, and an inventory management module 240.

In the example embodiment, the product sensors and tags module 210 manages aspects of product sensors used by the inventory management engine 150 as described herein. In some embodiments, product tags (not shown in FIG. 2) may be attached to articles of merchandise offered for sale at a retail store of a merchant. The product sensors and tags module 210 manages implementation aspects of the product tags, sometimes in conjunction with the tag identification module 220. Each product tag may be uniquely identifiable (e.g., via a "tag ID") such that the inventory management engine 150 may associated a particular tag with a particular article of merchandise in the merchant's physical inventory. In some embodiments, product sensors may be deployed within the merchant's retail store and, like the product tags, may be uniquely identifiable to associate a particular sensor with a particular article of merchandise in the merchant's physical inventory. The product sensors may be used to detect the presence or absence of the associated article of merchandise such as to enable the inventory management engine 150 to detect and determine when the article has been removed. The tag identification module 220 supports providing tag IDs for the product tags and product sensors, and associating the tag IDs with particular listings that may be generated by the inventory management engine 150.

The listings module 230, in the example embodiment, enables crowdsourcing to generate listings for the merchant's physical inventory. Users 106 provide data associated with the merchant's articles of merchandise to the listings module 230, which generates listings for the articles on the online e-commerce system 100. As listings sell (e.g., via the online e-commerce system 100), the inventory management module 240 communicates with the merchant to remove the sold article from their physical inventory and send the article to the online purchaser. As physical inventory is sold (e.g., in the retail store), the inventory management module 240 determines if there is an associated listing for the article (e.g., via the product tags) and may remove the associated listing from the online e-commerce system 100.

Figure 3A:
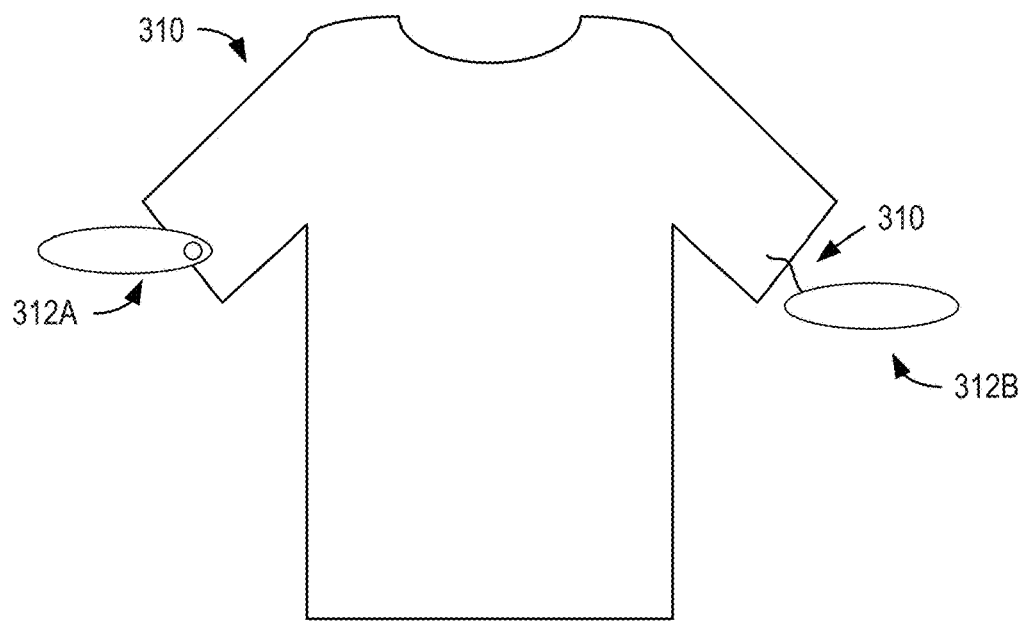
FIG. 3A illustrates example product tags physically attached to an article of merchandise that may be offered for sale in a physical retail environment of a merchant (e.g., a "brick and mortar" store).

FIG. 3A illustrates example product tags 312A, 312B physically attached to an article of merchandise 310 that may be offered for sale in a physical retail environment of a merchant (e.g., a "brick and mortar" store). In the example embodiment, the article 310 is an article of clothing (e.g., a T-shirt). However, it should be understood that other articles that may offered for sale in a physical retail environment may be possible, and are within the scope of this specification. The example product tag 312A is attached through the article 310 and, in some embodiments, may also be a security device (e.g., electronic article surveillance tags). The example product tag 312B is attached to the article 310 using a common clothing tag fastener.

Figure 3B:
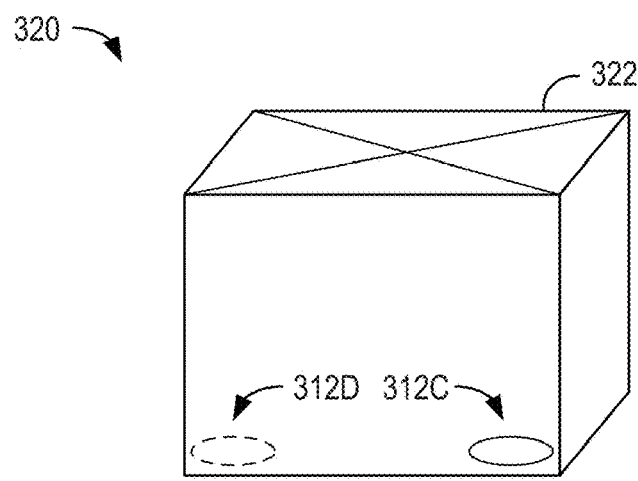
FIG. 3B illustrates example product tags attached to an article of merchandise that may be offered for sale in a physical retail environment of a merchant.

FIG. 3B illustrates example product tags 312C, 312D attached to an article of merchandise 320 that may be offered for sale in a physical retail environment of a merchant. In the example embodiment, the article 320 is provided within product packaging 322 (e.g., a box). However, it should be understood that other articles with product packaging 322 that may offered for sale in a physical retail environment may be possible, and are within the scope of this specification. The example product tag 312C is affixed or attached to an exterior surface of the packaging 322. The example product tag 312D is provided within the interior of the packaging 322 (e.g., as indicated by the broken lines).

Referring now to FIGS. 3A and 3B, product tags 312A, 312B, 312C, 312D (collectively, "product tags 312") each have an associated tag ID such that the inventory management engine 150 may distinguish one tag ID from another (e.g., a unique ID). In some embodiments, the tag IDs may be printed on the product tags 312 (e.g., encoded within a QR code, or printed as a numeric or alpha-numeric identifier on the tag 312). In other embodiments, the tag IDs may be embodied within an integrated circuit that can be read by a reader (e.g., a contact or radio-frequency identification (RFID) technology).

In some embodiments, the tag IDs may be static (e.g., printed onto the tag 312, or "hard-coded" into the integrated circuit). In other embodiments, the tag IDs may be dynamic or changeable (e.g., set by the merchant at the time the tag 312 is deployed into the retail environment or attached to a particular article 310, 320).

Each of the product tags 312A, 312B, 312C represent product tags that may be affixed or attached to certain types of merchandise, and remain visible or accessible to shoppers or store clerks (e.g., users 106). These tags 312A, 312B, 312C may be attached to the articles 310, 320 by the merchant, or may come pre-attached to the articles 310, 320 from the manufacturer or distributor. The product tags 312D may be packaged with the article 320 within the product packaging 322 by the manufacturer, or installed by the merchant or distributor prior to placing the product for sale within the merchant's environment.

During operation, the inventory management system 150 associates product tags 312 and tag IDs with particular articles 310, 320 and listings within the online e-commerce system 100.

Figure 4:
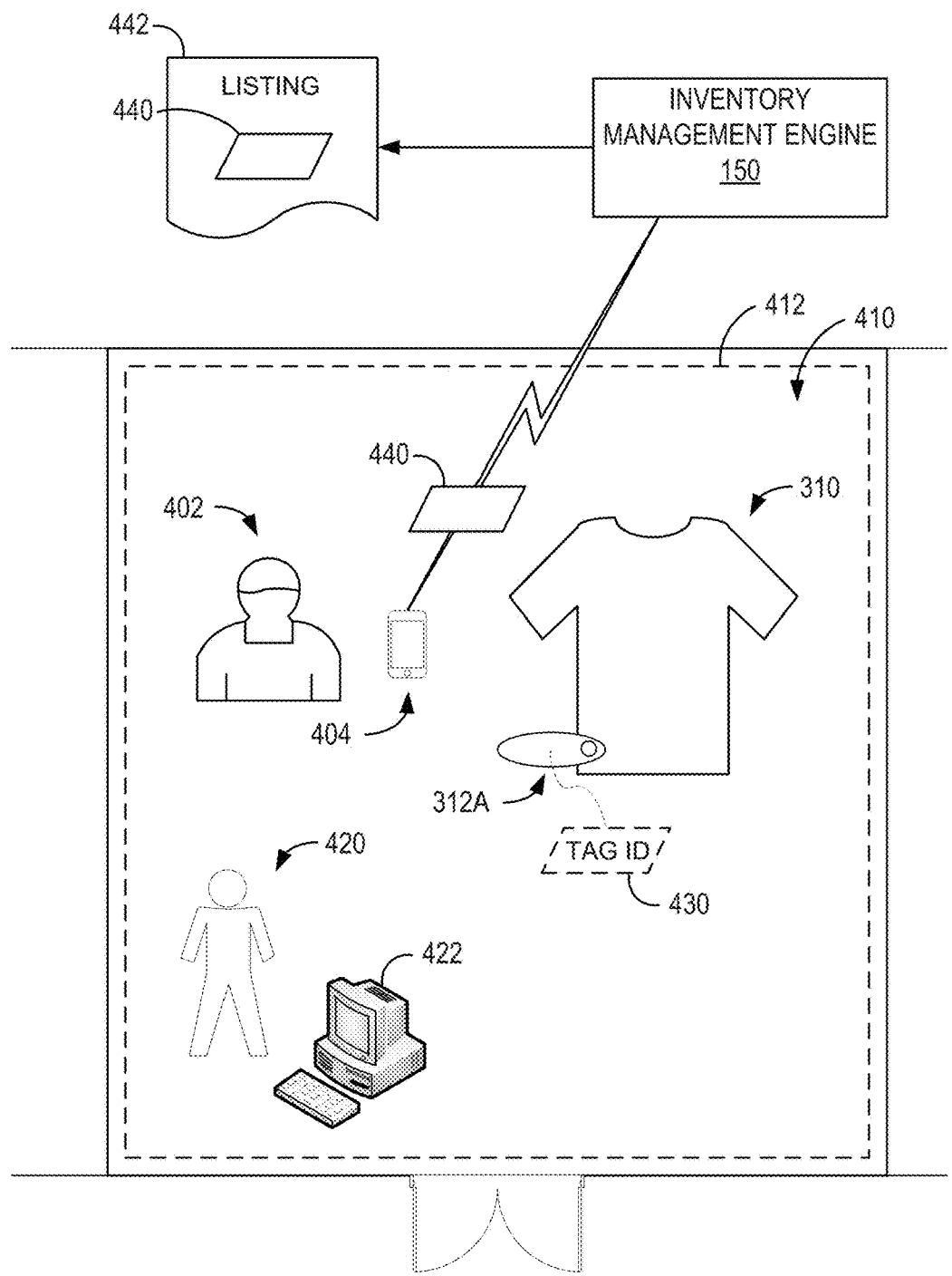
FIG. 4 illustrates an example crowdsourced listing scenario using the product tags shown in FIGS. 3A and 3B.

FIG. 4 illustrates an example crowdsourced listing scenario using the product tags 312 shown in FIGS. 3A and 3B. In the example embodiment, a shopper 402 is physically present and shopping at a merchant retail location (or simply "store") 410 of a merchant (not separately depicted). The shopper 402 carries with them a mobile computing device 404 (e.g., their smartphone or tablet), which may be similar to the client device 110. The mobile computing device 404 includes a client listings engine ("app"; not separately shown in FIG. 4; e.g., client application 114). The client listings engine is configured to communicate with the inventory management engine 150. Further, in some embodiments, the store 410 is geo-fenced, as illustrated by a virtual perimeter 412, such that the inventory management engine 150 and/or the client device 110 may determine (e.g., using a current GPS location of the client device 110) that the shopper 402 is currently in the store 410 of the merchant.

While in the store 410, the shopper 402 inspects the article of merchandise 310. In some embodiments, the article 310 includes a tag 312A attached to the article 310 (e.g., by a store clerk 420). The example tag 312A includes a QR code that identifies a tag ID 430 (e.g., printed on the product tag 312A).

During operation, the shopper 402 initiates a listing process with the inventory management system 150 for the article 310 using the client app on their mobile computing device 404. The shopper 402 enters product data 440 associated with the article 310 such as, for example, a product title (e.g., "Nike Golf Polo Shirt"), a sale price (e.g., "$50.00"), and an image of the product (e.g., as captured by the shopper 402 using a camera integrated within the mobile computing device 404). The product data 440 may also include the tag ID 430 (e.g., via a photo image scan of the QR code from the tag 312A). The mobile computing device 404 transmits the product data 440 to the inventory management engine 150.

Upon receipt of the product data 440, the inventory management engine 150 generates a listing 442 with some or all of the product data 440 (e.g., on the online e-commerce system 100). In some embodiments, the listing 442 may also be associated with the tag ID 430. Once created, the listing 442 may be offered for sale on the online e-commerce system 100.

In the example embodiment, the inventory management engine 150 determines the identity of the merchant selling the article 310 using the geo-fencing of the merchant. More specifically, the location of the mobile device 404 is determined (e.g., via GPS coordinates) and compared to the virtual perimeter 412 to determine that the mobile device 404 is within the merchant's store 410. In some embodiments, the mobile device 404 may determine the identity of the merchant. In other embodiments, the mobile device 404 may transmit location data of the mobile device 404 to the inventory management engine 150 and the inventory management engine 150 may determine the identity of the merchant. The listing 442 is associated with the determined listing.

In some embodiments, the inventory management engine 150 may request approval from the merchant (e.g., prior to generating the listing 442, or prior to placing the listing 442 for sale on the online e-commerce system 100). For example, the inventory management system 150 may transmit an email or a text message to the merchant, or to the clerk 420 (e.g., via a point-of-sale (POS) device 422, such as a tablet computer). As such, the merchant or the clerk 420 may perform verification or authorization operations before the listing 442 is offered on the online e-commerce system 100. For example, the clerk 420 may verify that the merchant really offers that product for sale (e.g., that they are the proper merchant for the product, and that they have the article 310 for sale), that elements of the product data 440 are correct (e.g., that the shopper 402 did not enter $5.00 for the shirt that is offered at $50.00), that the tag ID matches 430 properly matches the article 310, that the picture is representative of the article 310, and so forth.

As such, the shopper 402 performs as the "crowd" for crowdsourcing the generation of listings 442 for articles 310 of the merchant in the online e-commerce system 100. At least some of the burden of generating online listings 442 for their products is thus avoided by the merchant, thereby enabling merchants that may not have the time or resources to "online" their inventory themselves.

Further, in some embodiments, the inventory management engine 150 also performs inventory management functionality at the time the article is sold, either "online" via the listing 442 (herein an "online sale"), or "in-store" via the retail location 410 (herein an "in-store sale"). In the example embodiment, the article 310 includes the tag ID 430, which is associated with the listing 442 (e.g., as described above). The inventory management engine 150 uses the tag ID 430 associated with the article 310 to facilitate inventory management.

When an online sale of the listing 442 occurs, the inventory management engine 150 may automatically generate a notification communication to the merchant or the clerk 420 regarding the completion sale for the article 310. The inventory management engine 150 may, for example, generate a notification email or text indicating the sale, and may include product data 440 or other identifying information for the article 310 such as the title, the price, the picture of the article 310, or listing information associated with the listing 442. The notification communication serves to alert the merchant that the article 310 has sold, and provide information such that the clerk 420 can identify the article 310, remove the article 310 from sale, and package and ship the article 310 to the buyer of the listing 442. In some embodiments, the notification communication includes the tag ID 430 of the article 310. The clerk 420 may use the tag ID 430 to identify the particular article 310 within the store 410. Thus, the tag ID 430 may be used to confirm that the article removed from sale is the article 310 associated with the listing 442.

When an in-store sale of the article 310 occurs, the inventory management engine 150 may automatically alter the listing 442 based on the occurrence of the in-store sale. For example, presume another consumer comes into the store 410 after the shopper 402 invoked the listing management engine 150 to generate the listing 442 (e.g., the article 310 is offered for sale both in the store 410 and online). The consumer takes the article 310 to the clerk 420 for purchase (e.g., at the POS device 422). The clerk 420 inputs the tag ID 430 for the article 310 from the product tag 312A (e.g., scanning the tag 312A with the POS device 422 or other computing device configured to detect the tag ID 430 from the tag 312A, such as with an RFID reader, or a QR code scanner). In some embodiments, the point-of-sale device 422 includes a POS engine (not separately shown; e.g., an application, executing on the POS device 422, configured to communicate with the inventory management engine 150). The POS engine may be configured to detect the tag ID 430 of the article during the in-store sale (e.g., scanning the tag 312A).

A sale communication is transmitted to the inventory management engine 150 (e.g., from the POS device 422, via the POS engine). The sale communication indicates that the article 310 associated with the tag ID 430 has sold (e.g., as an in-store sale). The inventory management engine 150 identifies the listing 442 associated with the sale (e.g., based on the tag ID) and alters the status of the listing 442 based on the sale communication (e.g., removing the listing 442 from sale). For example, the inventory management engine 150 may cancel the listing 442, or mark the listing 442 as sold, or delete the listing 422, or otherwise remove the listing 422 from sale. As such, the use of the tag ID 430 during the in-store sale process enables the inventory management system 150 to automatically manage the listing 442 based on in-store sales, thereby avoiding a "dual-sale" problem, where a single article 310 may be inadvertently sold multiple times (e.g., once in the store, and again online).

Figure 5:
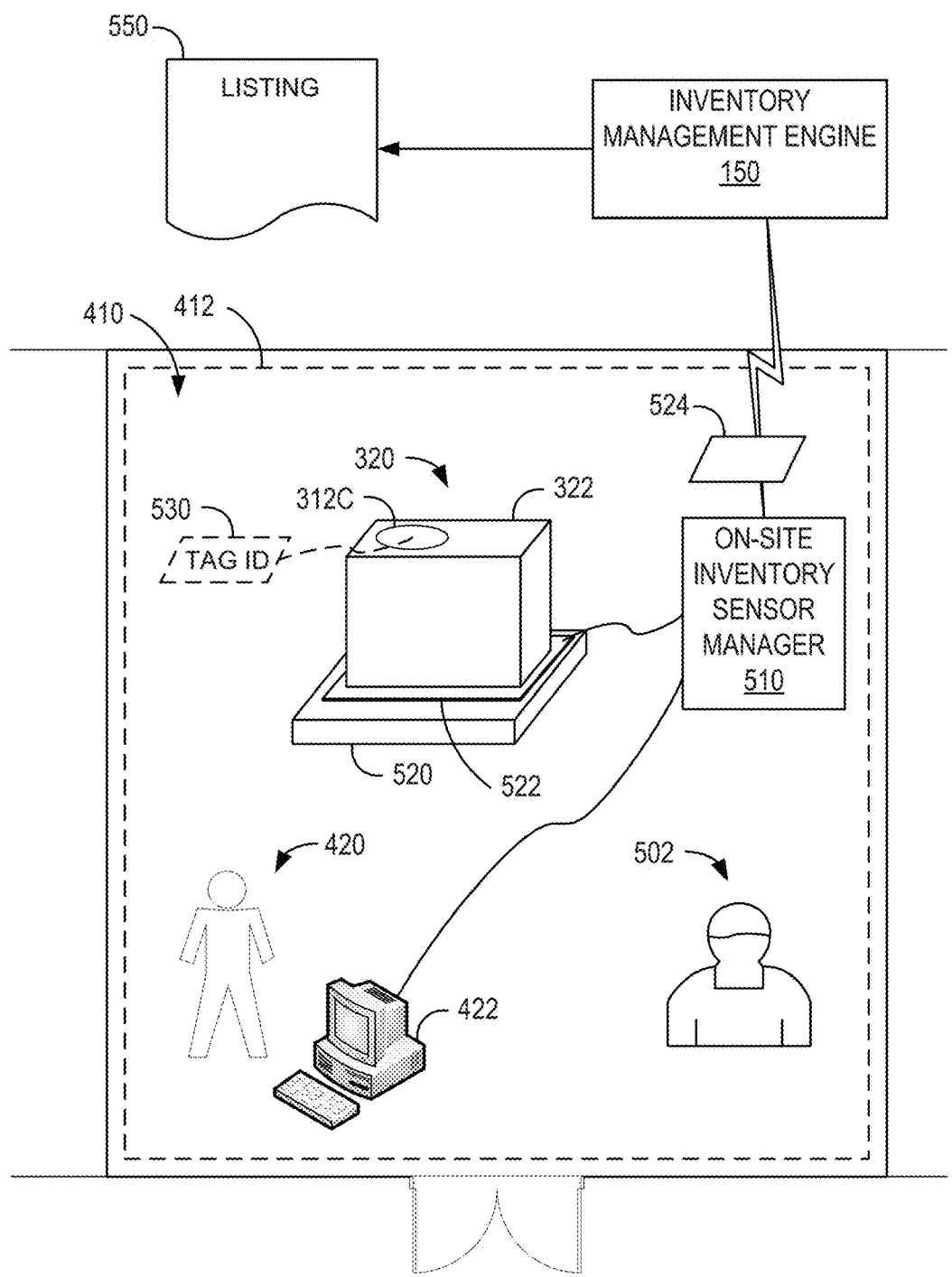
FIG. 5 illustrates an example product sensor used by the inventory management engine to manage a listing associated with a packaged article.

FIG. 5 illustrates an example product sensor 522 used by the inventory management engine 150 to manage a listing 550 associated with a packaged article 320. In the example embodiment, the article 320 has been listed on the online e-commerce system 100 for online sale (e.g., via the listing 550, and similar to as described above with respect to the article 310 and FIG. 4). The article 320 includes packaging 322, upon which a product tag 312C is affixed. The product tag 312C has been assigned a tag ID 530, which is also associated with the listing 550 (e.g., similar to the tag ID 430 and listing 450 shown in FIG. 4).

The store 410 includes shelving 520 for displaying products (e.g., article 320) to shoppers 502. In the example embodiment, a product sensor 522 (or just "sensor 522"; e.g., a sensor plate in the example shown in FIG. 4) sits upon the shelving 520, and the article 320 rests upon the sensor 522 (e.g., sits upon the plate). The sensor 522 is configured to detect the presence or absence of the article 320. The example sensor 522 is a load sensor (e.g., configured detect the presence or absence of the article 320 based on weight of the package 322). Further, the sensor 522 is associated with the article 320 (e.g., via the tag ID 530). As such, the store 410 may include multiple sensors 522, and each sensor 522 may be associated with a different article 320. Thus, the state changes determined by the sensor 522 may be associated with the particular article 320, and may thereby be associated with the listing 550 for that article.

In the example embodiment, the sensor 522 is communicatively coupled to an on-site inventory sensor manager 510. The on-site inventory sensor manager 510 is configured to detect changes in presence or absence of the article 320 and, in turn, sends status change communications 524 to the inventory management engine 150. The inventory management engine 150 changes the status of the listing 550 based on the status change communications 524.

For example, presume the article 320 is a box of shoes, and the article 320 is offered for sale both online (e.g., via the listing 550) and in-store (e.g., via physical presence of the article 320 in the store 410). The shopper 502 enters the store 410 and wishes to try on the shoes. Initially, the article 320 is on the shelving 520 and the sensor 522 is detecting that the article 320 is present on the shelving 520. As such, the listing 550 is in a state of "active" (e.g., available for sale). When the clerk 420 or the shopper 502 removes the article 320 from the shelving 520, the on-site inventory sensor manager 510 detects the state change (e.g., the absence) of the article 320 (e.g., via the sensor 522) and transmits a state change 524 of "absent" to the inventory management engine 150. Upon receipt of the state change 524, the inventory management engine 150 automatically changes the status of the listing 550 based on the state change 524. For example, the listing 550 may be temporarily suspended or cancelled based on the state change 524. In the example embodiment, the inventory management engine 150 suspends the listing 550 (e.g., a "suspended", "inactive", "held", or other such state) such that, for example, it may still be visible to users of the online e-commerce system 100, but purchase of the article 320 via the listing 550 is restricted while the listing 550 is in the "suspended" state. Thus, as the product is removed from the shelving 520, the associated online listing 550 for the product is suspended or otherwise restricted from being purchased in the online environment.

If the shopper 502 does not complete an in-store purchase for the article 320, the shopper 502 or the clerk 420 may re-shelve the article 320 by putting the article 320 back on the shelving 520. When the article 320 is placed back on the shelving 520, the sensor 522 detects a state change indicating the presence of the article 320 and transmits a state change 524 of "present" to the inventory management engine 150. The inventory management engine 150 alters the listing 550 to "active", thereby removing the "suspended" restriction from the listing 550 and enabling online consumers to purchase the article 320.

If the shopper 502 performs an in-store purchase of the article 320, the tag ID 530 of the product is transmitted to the inventory management engine 150 (e.g., as described above) and the listing 550 is removed or deleted from the online e-commerce system 100. In some embodiments, when the shopper 502 attempts to perform an in-store purchase of the article 320, the inventory management engine 150 may examine the listing 442 to determine whether or not an online sale of the article 320 has already occurred. If the article 320 has already sold online, then the inventory management engine 150 may transmit a rejection notice to the POS device 422, and the clerk 420 may terminate the attempted in-store purchase, thereby averting an accidental dual-sale.

In some embodiments, the product sensor 522 may be configured detect the tag ID 530 of the product tag 312 attached to the article 310, 320. For example, in some embodiments, the product sensor 522 may include an RFID sensor configured to detect and read an RFID-enabled product tag 312D attached to the article 320 (e.g., via near-field communication between the product tag 312D and the product sensor 522). In other embodiments, the product sensor 522 may include hardware configured to perform a visual scan of a QR code or other visually-detectable tag 312 attached to the article 320. In some embodiments, the product sensor 522 may be configured with a Bluetooth interface and configured to wirelessly communicate with the product tag 312 (e.g., pairing between the product tag 312 and the product sensor 522 indicating the association between the article 310 and the tag ID 530). Further, in some embodiments, the detection of the product tag 312 may serve as the detection mechanism for the "presence" or "absence" of the article 310, 320. As such, the on-site inventory sensor manager 510 and/or the inventory management engine 150 may automatically detect the tag ID 530 of the article 310, 320, automatically associate the tag ID 530 with the product sensor 522, and as such, automatically link the article 310, 320 placed near the sensor 522 with the proper listing 450, 550 in the online e-commerce system 100.

In some embodiments, the product sensor 522 may be a hanger (e.g., for hanging clothing articles, and in lieu of the plate-style sensor shown in FIG. 5) configured to detect the presence or absence of a clothing article. For example, the hanger may include a hook element and a frame element coupled together by a weight-based sensor configured to detect the presence of the article based on a hanging weight or pressure (e.g., a load sensor or strain gauge). When the clothing article is hung from the frame (e.g., when hung on display for sale), the sensor indicates the presence of the article, and when the clothing article is removed from the frame (e.g., when removed by the shopper 502 for fitting or for purchase of the article), the sensor indicates the absence of the article.

In some embodiments, the product sensor 522 may be configured to automatically detect presence of a new article (e.g., at a time when an article of clothing is first hung on the frame, or when the article) and initiate a detection of the product tag 312 (e.g., the closest product tag 312 in wireless range). As such, the product sensor 522 may automatically associate the article with the tag ID 530.

In some embodiments, the product sensor 522 may be a wireless device (e.g., a master Bluetooth device, and in lieu of the plate-style sensor shown in FIG. 5) configured to determine presence and absence of one or more articles 320 based on wireless detection of the product tag 312 (e.g., based on Bluetooth pairing between the product sensor 522 and the product tag 312). For example, the product sensor 522 may be positioned near the display table 520, on which one or more articles 320 are displayed for purchase. Each of the articles 320 includes a Bluetooth-enabled product tag 312. The product sensor 522 scans for nearby Bluetooth-enabled devices (e.g., the Bluetooth-enabled product tags 312). The product sensor 522 detects the tag IDs 530 from the product tags 312 and associates the product sensor 522 with each of the tag IDs 530. While each of the product tags 312 remain in range (e.g., paired) with the product sensor 522, the associated articles 320 are considered "present." When one of the articles 320 is moved out of range or otherwise becomes unpaired with the product sensor 522, the associated article 320 is changed to "absent."

In some embodiments, one or more additional wireless product sensors 522 may be positioned at various locations in the store 410. For example, an additional wireless product sensor 522 may be positioned near a fitting room (not shown) in the store 410. When an article 310 of clothing is removed from a hanger sensor (e.g., to try on the article 310), the hanger sensor may detect the absence event (e.g., via loss of Bluetooth pairing, as described above). When the shopper 502 takes the article 310 to the fitting room, the additional wireless product sensor 522 detects the presence of the article 310 (e.g., via pairing with the attached product tag 312), reads the tag ID 530, and automatically creates a new association between the additional wireless product sensor 522 and the article 310.

In some embodiments, the inventory management engine 150, or the on-site inventory sensor manager 510, may generate an alert for a detected absence of the article 320. For example, an absence event (e.g., a state change to "absent" based on any of the methods described herein) for the article 320 may trigger the alert immediately, or after a pre-determined period of time (e.g., 2 minutes, or 10 minutes) if the article 320 has not been changed back to "present" (e.g., if the article 320 was stolen) or if the article 320 does not have a correlated sale (either in-store or online). Thus, the alert event provides an indication of the missing (e.g., stolen, misplaced, miss-shelved) article 320, along with a timestamp of the alert. The timestamp may, for example, aid the clerk 420 or merchant in consulting camera footage for a criminal, or for other misplacing activity.

Figure 6:
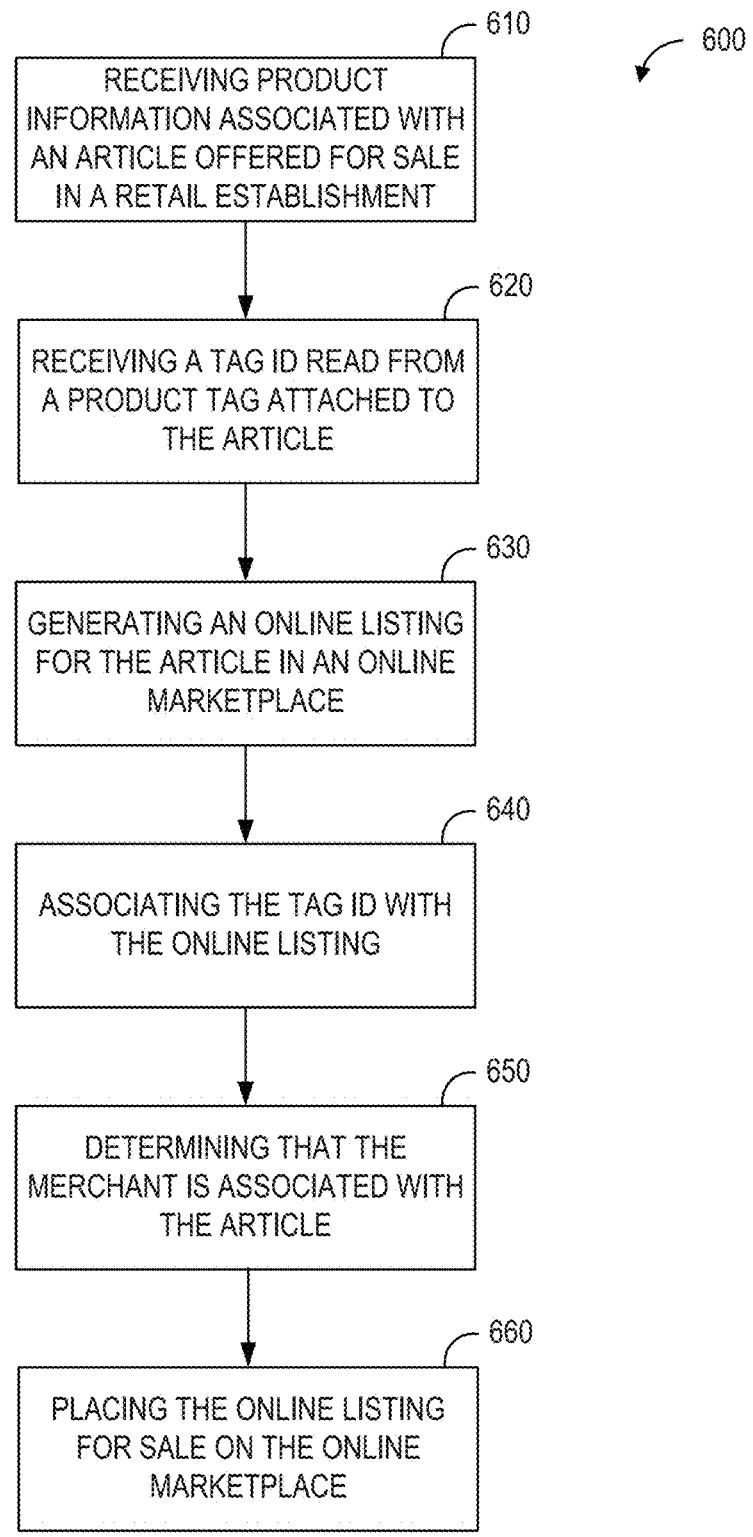
FIG. 6 illustrates a computerized method, in accordance with an example embodiment, for crowdsourcing and electronic article surveillance in retail inventory management.

FIG. 6 illustrates a computerized method 600, in accordance with an example embodiment, for crowdsourcing and electronic article surveillance in retail inventory management. The computerized method 600 is performed by a computing device comprising at least one processor and a memory. In the example embodiment, the computerized method 600 includes receiving product information associated with an article from a mobile computing device of a consumer (see operation 610). The article is offered for sale in a retail establishment of a merchant, and the article is attached to a product tag. The method 600 also includes receiving a tag identifier (ID) from the mobile computing device, the tag ID being read from the product tag (see operation 620). The method 600 further includes generating an online listing for the article in an online marketplace, the online listing including the product information (see operation 630). The method 600 also includes associating the tag ID with the online listing (see operation 640). The method 600 further includes determining that the merchant is associated with the article (see operation 650). The method 600 further includes placing the online listing for sale on the online marketplace (see operation 660).

In some embodiments, the method 600 includes receiving, by a client listings engine on the mobile computing device, the product information associated with the article from the consumer, and reading, by the client listings engine, the tag ID from the product tag. In some embodiments, the product tag includes a radio-frequency identification (RFID) tag configured with the tag ID, and the method 600 further includes reading the tag ID using an RFID reader on the mobile computing device. In some embodiments, the product tag includes a quick response (QR) code configured with the tag ID, and the method 600 further includes reading the QR code using a camera device of the mobile computing device.

In some embodiments, the method 600 includes receiving, from a point-of-sale (POS) device of the merchant, a message indicating an in-store sale of the article, the message including the tag ID read from the product tag by the POS device, identifying the online listing based on the tag ID from the message, and removing the online listing from sale on the online marketplace. In some embodiments, the method 600 includes receiving, from the mobile computing device, geo-location information of the mobile computing device, wherein determining that the merchant is associated with the article includes identifying the merchant using geo-fencing based on the geo-location information of the mobile computing device. In some embodiments, the method 600 includes receiving an indication of absence of the article from product sensor means for detecting absence of the article, and changing the state of the online listing based on the indication of absence.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 7:
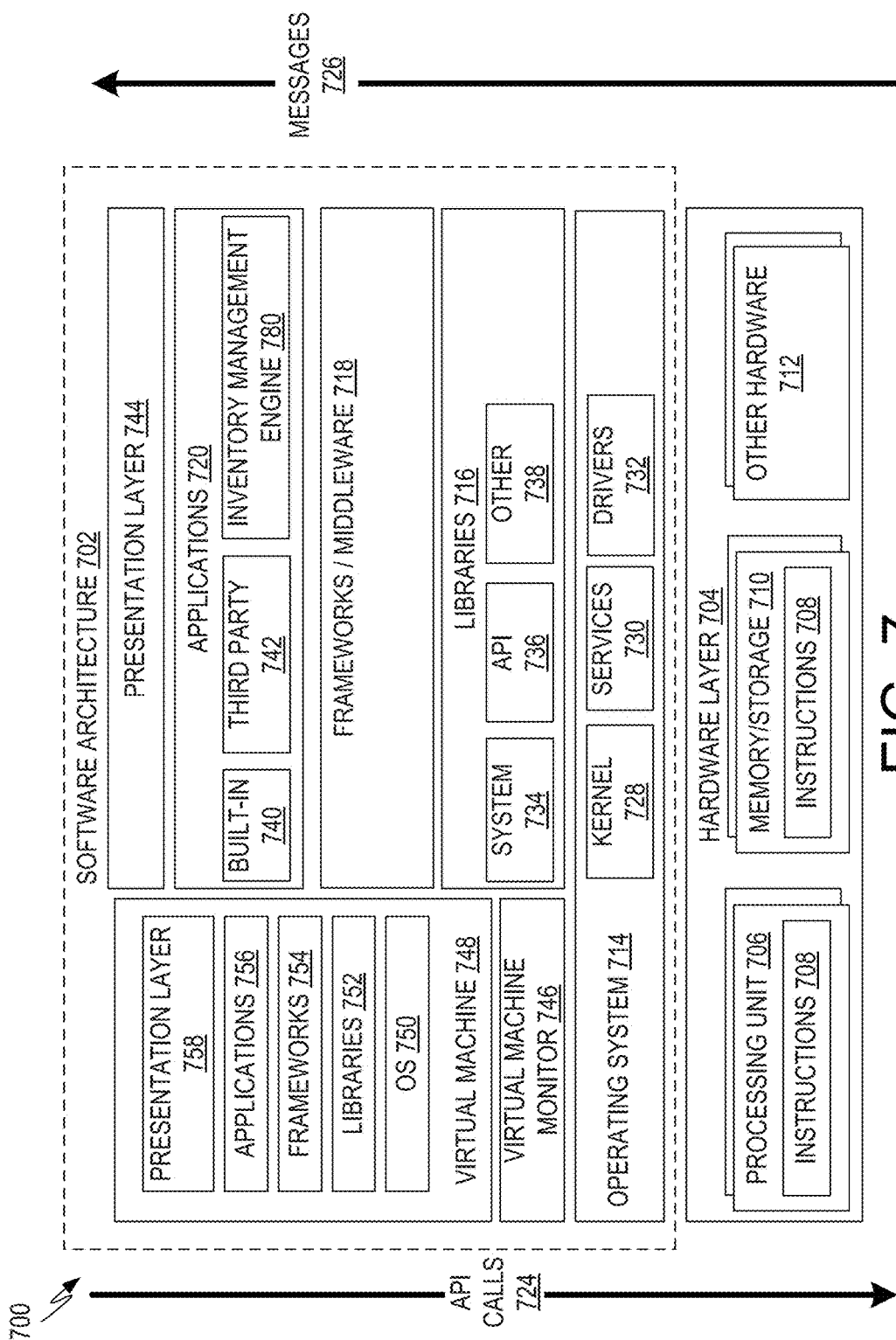
FIG. 7 is a block diagram illustrating an example software architecture, which may be used in conjunction with various hardware architectures herein described, to perform crowdsourcing and electronic article surveillance in retail inventory management.

FIG. 7 is a block diagram 700 illustrating an example software architecture 702, which may be used in conjunction with various hardware architectures herein described, to perform crowdsourcing and electronic article surveillance in retail inventory management. An inventory management engine 780, which is shown in a layer of applications 720, may be similar to the inventory management engine 150, but may be provided in whole or in part at other layers shown in FIG. 7. FIG. 7 is a non-limiting example of a software architecture 702, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 having associated executable instructions 708. The executable instructions 708 represent the executable instructions of the software architecture 702, including implementation of the methods, modules, and so forth described herein. The hardware layer 704 also includes memory/storage 710, which also includes the executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks or middleware 718, applications 720, and a presentation layer 744. Operationally, the applications 720 and/or other components within the layers may invoke application programming interface (API) calls 724 through the software stack and receive a response as messages 726. The layers illustrated are representative in nature and not all software architectures 702 have all layers. For example, some mobile or special purpose operating systems 714 may not provide the frameworks/middleware 718, while others may provide such a layer. Other software architectures 702 may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than by interfacing directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system 714 or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. The third-party applications 742 may include an application developed using the Android™ or iOS™ software development kit (SDK) by an entity other than the vendor of the particular platform, and may be mobile software running on a mobile operating system 714 such as iOS™, Android™, Windows® Phone, or other mobile operating systems 714. The third-party applications 742 may invoke the API calls 724 provided by the mobile operating system, such as the operating system 714, to facilitate functionality described herein.

The applications 720 may use built-in operating system functions (e.g., kernel 728, services 730, and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures 702 use virtual machines. In the example of FIG. 7, this is illustrated by a virtual machine 748. The virtual machine 748 creates a software environment where applications/modules can execute as if they were executing on a hardware machine (such as the machine 800 of FIG. 8, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748, such as an operating system (OS) 750, libraries 752, frameworks 754, applications 756, and/or a presentation layer 758. These layers of software architecture executing within the virtual machine 748 can be the same as corresponding layers previously described or may be different.

Figure 8:
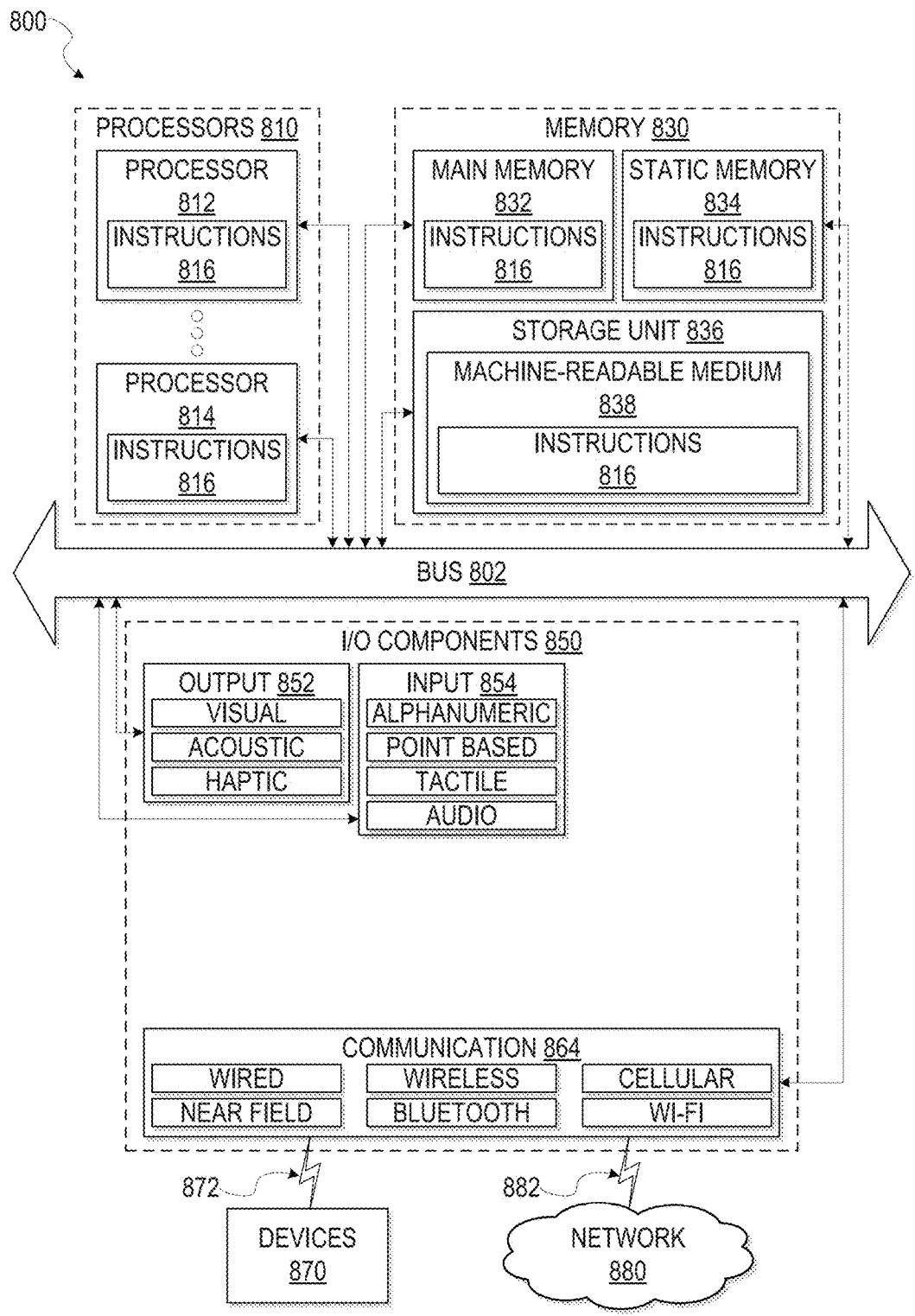
FIG. 8 is a block diagram illustrating components of a machine, according to some example embodiments, configured to read instructions from a machine-readable medium (e.g., a machine-readable storage medium) and perform any one or more of the methodologies discussed herein.

FIG. 8 is a block diagram illustrating components of a machine 800, according to some example embodiments, configured to read instructions 816 from a machine-readable medium 838 (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions 816 transform the general, non-programmed machine 800 into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a personal digital assistant (PDA), a cellular telephone, a smart phone, a mobile device, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a GPU, a digital signal processor (DSP), an ASIC, a radio-frequency integrated circuit (RFIC), another processor, or any suitable combination thereof) may include, for example, a processor 812 and a processor 814 that may execute the instructions 816. The term "processor" is intended to include a multi-core processor 812 that may comprise two or more independent processors 812, 814 (sometimes referred to as "cores") that may execute the instructions 816 contemporaneously. Although FIG. 8 shows multiple processors 812, 814, the machine 800 may include a single processor 812 with a single core, a single processor 812 with multiple cores (e.g., a multi-core processor), multiple processors 812, 814 with a single core, multiple processors 812, 814 with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of the processors 810 are examples of machine-readable media 838.

As used herein, "machine-readable medium" means a device able to store the instructions 816 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific I/O components 850 that are included in a particular machine 800 will depend on the type of machine. For example, portable machines 800 such as mobile phones will likely include a touch input device or other such input mechanisms, while a headless server machine 800 will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine 800 or any of a wide variety of peripheral devices (e.g., a peripheral device coupled via a USB).

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. An inventory management system comprising:
   at least one hardware processor configured to perform operations comprising; and
   receiving, from a mobile computing device of a consumer, product information associated with an article offered for sale in a retail establishment of a merchant, a product tag is attached to the article, the product tag including a tag identifier (ID), the tag ID being a unique identifier assigned to the product tag;
   receiving the tag ID from the mobile computing device of the consumer, the tag ID being read from the product tag;
   generating an online listing for the article in an online marketplace, the online listing including the product information;
   associating the tag ID with the online listing;
   determining that the merchant is associated with the article; and
   placing the online listing for sale in the online marketplace on behalf of the merchant based on receiving the product information and the tag ID from the mobile computing device of the consumer, the placing of the online listing making the online listing accessible to a plurality of consumers.

2. The inventory management system of claim 1, further comprising:
   a client listing engine, executing on the mobile computing device, configured to perform operations comprising:
   receiving the product information associated with the article from the consumer;
   reading the tag ID from the product tag; and
   transmitting the product information and the tag ID to the inventory management engine.

3. The inventory management system of claim 2, wherein the product tag includes a radio-frequency identification (RFID) tag configured with the tag ID, wherein reading the tag ID from the product tag includes reading the tag ID using an RFID reader on the mobile computing device.

4. The inventory management system of claim 2, wherein the product tag includes a quick response (QR) code configured with the tag ID, wherein reading the tag ID from the product tag includes reading the QR code using a camera device of the mobile computing device.

5. The inventory management system of claim 1, wherein the operations further comprise:
   receiving, from a point-of-sale (POS) device of the merchant, a message indicating an in-store sale of the article, the message including the tag ID read from the product tag by the POS device;

identifying the online listing based on the tag ID from the message; and removing the online listing from sale on the online marketplace.

6. The inventory management system of claim 1, wherein the operations further comprise:

receiving, from the mobile computing device, geo-location information of the mobile computing device, wherein determining that the merchant is associated with the article includes identifying the merchant using geo-fencing based on the geo-location information of the mobile computing device.

7. The management system of claim 1, wherein the operations further comprise:

detecting absence of the article; and receiving an indication of absence of the article from the product sensor means; and transmitting the indication of absence to the inventory management engine, wherein the inventory management engine is further configured to perform operations comprising changing the state of the online listing based on the indication of absence.

8. The inventory management system of claim 1, further comprising the product tag.

9. The inventory management system of claim 1, wherein the product information and tag ID received from the mobile computing device is received from a site application running on the mobile device, wherein the site application is configured to provide shopping and searching capabilities to the consumer in addition to inventory management capabilities.

10. A computer-implemented method of inventory management comprising:

receiving, from a mobile computing device of a consumer, product information associated with an article offered for sale in a retail establishment of a merchant, a product tag is attached to the article, the product tag including a tag identifier (ID), the tag ID being a unique identifier assigned to the product tag;

receiving the tag ID from the mobile computing device, the tag ID being read from the product tag;

generating an online listing for the article in an online marketplace, the online listing including the product information;

associating the tag ID with the online listing;

determining that the merchant is associated with the article; and placing the online listing for sale in the online marketplace on behalf of the merchant, based on receiving the product information and the tag ID from the mobile computing device of the consumer, the placing of the online listing making the online listing accessible to a plurality of consumers.

11. The computer-implemented method of claim 10, further comprising:

receiving, by a client listings engine on the mobile computing device, the product information associated with the article from the consumer; and reading, by the client listings engine, the tag ID from the product tag.

12. The computer-implemented method of claim 11, wherein the product tag includes a radio-frequency identification (REID) tag configured with the tag ID, the method further comprising reading the tag ID using an RFD reader on the mobile computing device.

13. The computer-implemented method of claim 10, further comprising:

receiving, from a point-of-sale (POS) device of the merchant, a message indicating an in-store sale of the article, the message including the tag ID read from the product tag by the POS device;

identifying the online listing based on the tag ID from the message; and removing the online listing from sale on the online marketplace.

14. The computer-implemented method of claim 10, further comprising:

receiving, from the mobile computing device, geo-location information of the mobile computing device, wherein determining that the merchant is associated with the article includes identifying the merchant using geo-fencing based on the geo-location information of the mobile computing device.

15. The computer-implemented method of claim 10, further comprising:

receiving an indication of absence of the article from product sensor means for detecting absence of the article; and changing the state of the online listing based on the indication of absence.

16. A non-transitory machine-readable medium storing processor-executable instructions which, when executed by one or more hardware processors of a machine, cause the one or more hardware processors to perform operations comprising:

receiving, from a mobile computing device of a consumer, product information associated with an article offered for sale in a retail establishment of a merchant, a product tag is attached to the article, the product tag including a tag identifier (ID), the tag ID being a unique identifier assigned to the product tag;

receiving the tag ID from the mobile computing device, the tag ID being read from the product tag;

generating an online listing for the article in an online marketplace, the online listing including the product information;

associating the tag ID with the online listing;

determining that the merchant is associated with the article; and placing the online listing for sale in the online marketplace on behalf of the merchant, based on receiving the product information and the tag ID from the mobile computing device of the consumer, the placing of the online listing making the online listing accessible to a plurality of consumers.

17. The machine-readable medium of claim 16, wherein the operations further comprise:

receiving, from a point-of-sale (POS) device of the merchant, a message indicating an in-store sale of the article, the message including the tag ID read from the product tag by the POS device;

identifying the online listing based on the tag ID from the message; and removing the online listing from sale on the online marketplace.

18. The machine-readable medium of claim 17, wherein the product tag includes a quick response (OR) code configured with the tag ID, wherein the operations further comprise receiving the message including the tag ID read from the OR code using a camera device of the mobile computing device.

19. The machine-readable medium of claim 16, wherein the operations further comprise:

receiving geo-location information of the mobile computing device;
identifying the merchant using geo-fencing based on the geo-location information of the mobile computing device; and
associating the online listing with the merchant.

20. The machine-readable medium of claim 16, the operations further comprising:
receiving an indication of absence of the article from product sensor means for detecting absence of the article; and
changing the state of the online listing based on the indication of absence.

\* \* \* \* \*

UNITED STATES PATENT AND TRADEMARK OFFICE
CERTIFICATE OF CORRECTION

PATENT NO. : 10,229,386 B2  
APPLICATION NO. : 15/059401  
DATED : March 12, 2019  
INVENTOR(S) : Evan Patrick Thomas Page 1 of 1

It is certified that error appears in the above-identified patent and that said Letters Patent is hereby corrected as shown below:

In Column 21, Line 13, in Claim 7, after "The" insert -- inventory --.

In Column 21, Line 63, in Claim 12, delete "(REID)" and insert -- (RFID) --, therefor.

In Column 21, Line 64, in Claim 12, delete "RFD" and insert -- RFID --, therefor.

In Column 22, Line 61, in Claim 18, delete "(OR)" and insert -- (QR) --, therefor.

In Column 22, Line 64, in Claim 18, delete "OR" and insert -- QR --, therefor.

Signed and Sealed this  
Twenty-first Day of July, 2020

Andrei Iancu  
*Director of the United States Patent and Trademark Office*